Feb. 14, 1950     O. M. JENSEN     2,497,775

MACHINE FOR GRINDING AND SHARPENING SAW BLADES

Filed July 19, 1947     2 Sheets-Sheet 1

INVENTOR.
OTTO M. JENSEN

BY John W. Michael
ATTORNEY.

Feb. 14, 1950     O. M. JENSEN     2,497,775
MACHINE FOR GRINDING AND SHARPENING SAW BLADES
Filed July 19, 1947     2 Sheets-Sheet 2
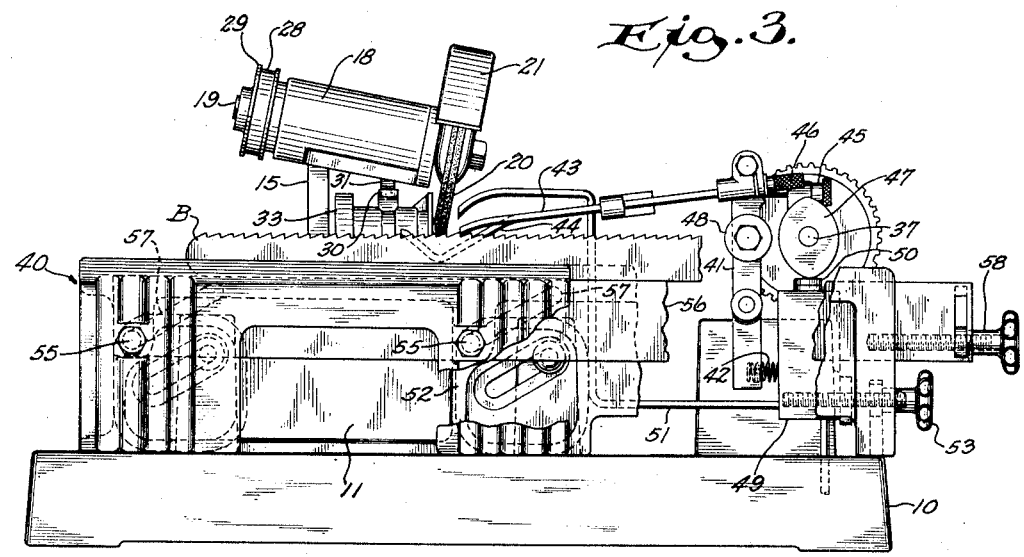
INVENTOR.
OTTO M. JENSEN
BY John W. Michael
ATTORNEY.

Patented Feb. 14, 1950

2,497,775

UNITED STATES PATENT OFFICE 2,497,775

MACHINE FOR GRINDING AND SHARPENING SAW BLADES

Otto M. Jensen, Racine, Wis., assignor to Peerless Machine Company, Racine, Wis., a corporation of Wisconsin Application July 19, 1947, Serial No. 762,051

4 Claims. (Cl. 76—40)

This invention relates to improvements in machines for grinding and sharpening saw blades particularly the types of blades used in power-driven hack saws.

It has been the practice in grinding machines of this type to move the rotating grinding wheel so that its contacting peripheral surface moves downwardly over the front surface of the tooth. As the outermost periphery of the wheel reaches the bottom of the tooth, a specially sloped peripheral surface of the wheel will grind the back face of the adjacent tooth. In some instances the back of the tooth is ground by gradually raising the grinding wheel and simultaneously advancing the saw blade. Either method of grinding hollows out or concaves the backs of the teeth, resulting in a concave cutting edge. Such edge on the raking tooth and a leading and following offset tooth appears compositely as viewed in Fig. 6. Because of this the teeth tend to draw the blade laterally away from its desired cutting path and a blade so ground will not cut straight. The thickness of hack saw blades varies over a wide range. Hence, with the present type of grinders, blades of a certain thickness will be properly alined with the axis of the grinder while those of other thicknesses will be ground off center. A composite concave cutting edge is formed which is deeper on one side than on the other side of the blade. This is an additional factor in causing the blades so ground and sharpened to be cut off to one side of the desired path. In addition the concave shape takes away backing material and weakens the strength of the cutting edge.

One of the objects of this invention, therefore, is to provide a saw blade grinding machine which will grind the offset teeth of the saw blade without removing an unnecessary amount of backing stock for the teeth.

Another object of this invention is to provide a grinding machine which will grind the teeth of the saw blade so that after grinding the blade will inherently tend to cut straight and not eat off to one side of the desired path of cut.

These objects are obtained by moving the grinding wheel from side to side of the saw blade during the grinding process. The path of the lowest contacting point on the specially shaped perimeter of the wheel is moved in a plane perpendicular to the plane of the blade. With this method of moving the grinding wheel the surface of the front and back of each tooth will be ground flat and the cutting edge formed by their intersection will be a straight line perpendicular to such plane as is shown in the composite view of Fig. 5 of a raking and leading and following offset tooth. Blades ground in this manner cut better than new blades. New blades, as shown in Fig. 4, have the top cutting edge of the offset teeth sloped downwardly from the similar edge of the raker teeth. This causes the teeth to bite unevenly into the work. The top cutting edge of the offset teeth is also sloped rearwardly from the similar edge of the raker teeth to create a negative angle, see Fig. 7, on the cutting side of such offset teeth. This results also in poor cutting action. The blades ground by the machine of this invention will have this negative angle removed, as indicated in the broken line of Fig. 7. In order to move the grinding wheel in the manner described and during such movement to readily supply rotative power to it, the wheel is carried in a grinding head pivoted to a pivotal link which in turn is pivoted to the base of the machine. The pivot at the base is coaxial with the drive shaft of the motor and hence rotative power from the motor can be readily transmitted by belts and pulleys to the grinding wheel and still permit such wheel to be freely moved in its plane of rotation. Such movement, however, is (a) governed by a crank and connecting rod which imparts reciprocal swinging movement to the pivotal link and (b) directed by an arcuate cam and roller which controls the up and down movement of the grinding wheel head. By correlating the arcuate path of travel of the pivoted end of the head and the arcuate cam, the grinding wheel center (hence its periphery) will move back and forth in a straight line. It can thus be moved from side to side of a saw blade held beneath the center of its line of travel and the teeth will be ground as above described. Indexing mechanism is employed to advance the blade one tooth at each end of the travel of the wheel, thus grinding a tooth on each stroke. The indexing mechanism is therefore operated by a two peak cam which is also utilized to power the plunger of a coolant pump.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 3 is a front elevational view of the machine of Fig. 1;

Figs. 4, 5, and 6 are enlarged diagrammatic fragmentary sectional views of saw blades of the type used on power saws showing a raker tooth and a leading and following offset tooth, the view of Fig. 4 illustrating the shape of a new blade, the view of Fig. 5 illustrating the shape of a blade as ground in a machine embodying the present invention, and Fig. 6 showing the shape of the blade as ground in prior art grinding machines; and Fig. 7 is an enlarged fragmentary diagrammatic top plan view of a saw blade showing the negative rake of an offset tooth and in broken line, the result of the grinding and sharpening such tooth in the machine embodying the present invention.

Figure 1:
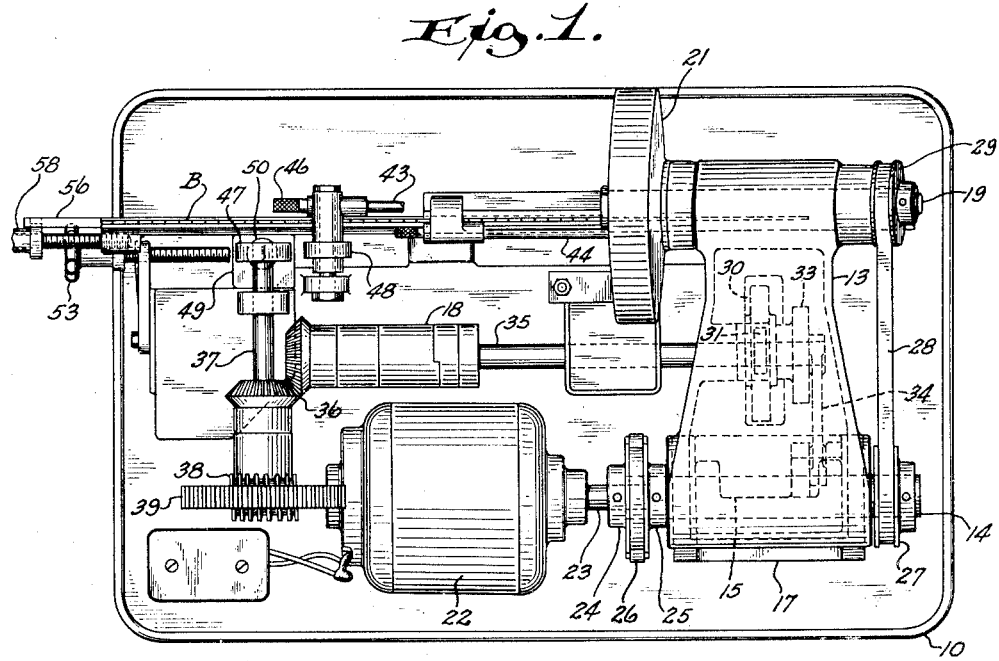
Fig. 1 is a top plan view of a saw grinding and sharpening machine embodying the invention, the front of the machine being toward the top as so viewed.
Figure 2:
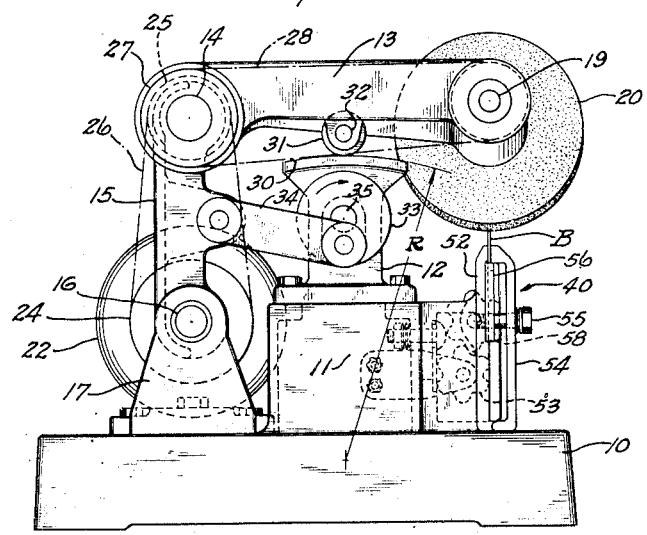
Fig. 2 is a view in right end elevation of the machine as viewed in Fig. 1.

Referring to the drawings by reference numerals, the grinding machine has a base 10 provided with a pad 11 to the front face of which is secured a blade-holding vise 40 and on the top of which is a supporting bracket 12 for the grinding head 13. The grinding head 13 is pivotally supported by a shaft 14 to a pivotal link 15. The link 15 is pivotally mounted by shaft 16 to a bracket 17 on the base 10. The free end of the grinding head 13 rotatively mounts the shaft 19 which carries the grinding wheel 20. As is the standard practice in saw grinders, the axis of rotation of the wheel 20 is sloped at an angle of substantially ten degrees to the horizontal in order to permit proper dressing down of the wheel. It is desirable to provide a removable wheel guard 21 (omitted in Fig. 2). The shafts 14 and 16 are long enough (see Fig. 1) to provide two spaced bearing surfaces to make the structure rigid. As so supported, the grinding wheel 20 is free to move in any direction in its predetermined plane of its rotation.

To supply rotative power to the grinding wheel 20, a motor 22 is mounted on the base 10 with its shaft 23 coaxial with the shaft 16. The shaft 23 mounts a driving pulley 24 which is connected by belt 26 to a driven pulley 25 on shaft 14. A driving pulley 27 on the other end of the shaft 14 is connected by belt 28 to the driven pulley 29 on the grinder shaft 19. In this fashion the rotative power of the motor 22 is imparted to the grinder wheel 20 without having the non-rotative movement of the wheel affect the tension in the transmission belts.

It will be seen from the description thus far that as the link 15 is oscillated the axis of the shaft 14 will move in an arcuate path causing the pivoted end of the grinding head 13 to have a slight up and down movement as it is moved back and forth. Since it is desired to have the center of the grinding wheel move back and forth in a straight line perpendicular to the plane of the saw blade, the grinding head 13 intermediate its ends is supported for movement on an arcuate surface 30 formed on the supporting bracket 12. It is preferable to use a roller 31 mounted on shaft 32 to support the head 13 on the surface 30. However, the main thing is to cause such portion of the head to move in a path identical with the surface 30. The weight of grinding head 13 and grinding wheel 20 is sufficient to maintain contact between the roller 31 and the arcuate surface 30. The radius R of the arcuate surface 30 varies depending upon the distances between the axis of shafts 16 and 14, shafts 14 and 32, and shafts 32 and 19. When these distances have been determined, the radius R can be determined empirically. To do this, it is only necessary to understand that as the axis of shaft 14 moves to the left and downwardly, the axis of shaft 19 (using shaft 32 as a fulcrum) moves to the left and upwardly. To offset this upward movement, the shaft 32 must be lowered but not as rapidly per unit of longitudinal movement as the shaft 14. Such movement of shaft 32 is governed by the arcuate surface 30. Stated otherwise, the arcuate surface 30 is identical to the path inscribed by the center of shaft 32 as the center of shaft 14 is reciprocally moved through its arcuate path while the center of shaft 19 is constrained to reciprocal movement in a straight line. In this embodiment the distance between the axis of shafts 16 and 14 is 6.375 inches, between shafts 14 and 32 is 4.750 inches, and between shafts 32 and 19 is 4.750 inches. The radius R is 9.500 inches.

The oscillating movement of the link 15 is governed by a crank 33 and connecting rod 34. The crank 33 is mounted on a shaft 35 pivotally mounted in the bracket 12 and operated through a miter gear arrangement 36 from shaft 37. Shaft 37 is driven by a worm 30 on the other end of the motor shaft 23 and a worm wheel 39 on the shaft 37. It is preferable to have a coupling 18 between the miter gears 36 and the shafts 35 to permit that shaft to be rotated independently of the motor 22 to position the grinding wheel during the adjusting and setting of the blade B. The throw of crank 33 is sufficient to move the grinding wheel 20 from a point on one side of the blade B where its perimeter clears the blade to a point on the other side of such blade where its perimtter will likewise clear such blade. The coupling 18 has two positions one hundred eighty degrees apart and hence the timing between the oscillation of the wheel 20 and the operation of the indexing mechanism will not be altered.

As the grinding wheel 20 is oscillated back and forth, the blade B mounted in the vise 40 is advanced one tooth with each stroke of the grinding wheel. The indexing mechanism to accomplish this is of general standard design. It consists of a pivotally mounted lever 41 biased in a clockwise direction by a spring 42, tooth-engaging fingers 43 and 44 operated by such lever, and a two peaked cam 47 for operating the lever at predetermined times. The throw of the cam is adjusted by a stop screw 45 and the fingers are adjusted by nut 46. The peaks of the cam preferably engage a roller 48 on the lever 41. The shafts 35 and 37 rotate at the same rate. With the crank 33 in the center position shown in Fig. 2, the cam 47 is in the position shown in Fig. 3. As the crank 33 rotates clockwise through ninety degrees from the position shown in Fig. 2, the grinding wheel 20 will first have its periphery withdrawn inwardly from the blade B and then a peak of the cam 47 will engage the roller 48 to advance the blade B a distance of one tooth.

The base 10 is provided with a sump for a coolant and a coolant pump 49 is mounted just below the cam 47. A plunger 50 extending from the pump is operated by the peaks of the cam 47 to pump coolant from the sump through the conduit 51 to work contact point of the grinding wheel. The pumping action takes place while the grinding wheel is directly over and in grinding contact with the blade B.

The vise 40 for holding the blade B is of standard construction and consists of a rear plate 52, a front plate 54, and a middle plate 56. The rear plate 52 is adjustably mounted to the front of the pad 11. An adjusting nut 53 controls the raising and lowering of the entire vise. The front plate 54 is fastened to the rear plate 52 by bolts 55. It is preferable to use a spring washer or spring which will resiliently urge the plate 54 toward the plate 52. The middle plate 56 is mounted between the front and rear plates and is provided with slots 57 accommodating the bolts 55. The action of an adjusting rod 58 provides longitudinal movement to the plate 56 to raise or lower it with respect to the vise as desired. By these two adjustments the vise as a unit may be raised and lowered as the grinding wheel wears down and a small individual adjustment may be made to aline the blade with the periphery of the grinding wheel 20.

In the operation of the device, the blade B is first positioned in the vise 40 while the grinding wheel is withdrawn. The periphery of the grinding wheel is then generally alined with a tooth on the blade. The wheel is then advanced by hand to test such alinement. The indexing fingers are then placed on the blade and adjusted in the customary way. The machine is then set in operation and a trial run made on a tooth adjacent one end. Thereafter the blade is adjusted to give a suitable grind depth by slight adjustment during operation on the trial run. Once the device has been set for a predetermined blade, the machine operates automatically to grind the rest of the blade. Each time the grinding wheel 20 reaches an extreme end of its stroke, the indexing mechanism advances the blade one tooth so that on the return stroke the grinding wheel grinds another adjacent tooth. As the grinding wheel approaches the center of its travel, the cam 47 depresses the plunger 50 and a squirt of coolant is delivered from the conductor 51 to the wheel and blade.

The grinding wheel 20 has its periphery dressed so that with the wheel, angled as shown, one surface of the side of the wheel will be vertical and in alinement with the face of a tooth while the surface of the other side of the wheel will be sloped to conform with the slope of the back of the tooth. It is well known in this art to provide wheel-dressing means which maintains such surfaces standard as the wheel is worn and dressed.

In Figs. 4 to 7, inclusive, there are illustrated enlarged views of a power saw blade B. These blades have raker teeth 60 and offset teeth 61 and 62. Usually there are two offset teeth between each raker tooth. When the blade is new, the offset teeth 62, having been formed by bending, have cutting edges 63 sloped with respect to the cutting edge 63 of the raker tooth 60. Also, as shown in Fig. 7, the cutting edge 63 will be sloped at an angle indicated at A to give the cutting side of teeth 62 a negative rake. The result of these conditions is that the teeth tend to bite into the work unevenly and the action of the blade will not be smooth and regular. When a new or old blade is ground as previously described, the fronts and backs of the teeth will be ground flat and hence the cutting edges 63 of all of the teeth will be straight and lie in the same plane as shown in Fig. 5. In addition to this, the negative angle A will be ground down to the broken line resulting in the right angle C (see Fig. 7). Because of this the ground blade cuts evenly and operates smoothly and any tendency for the blade to move to one side or the other of the desired path is eliminated. When the blades are ground by prior grinding devices (even when the blade is properly alined beneath the center of the cutting wheel) the backs of the blades are hollow ground which results in a concave cutting edge 63 as shown in Fig. 6. The concave cutting edge tends to draw the blade to one side of its normal desired path of cut. This tendency is greatly increased when the blade is not centrally positioned beneath the grinding wheel during the grinding.

Although only one embodiment of the invention is shown and described herein, it will be understood that this application is intended to cover such changes or modifications as come within the spirit of the invention or scope of the following claims.

I claim:

1. A saw blade sharpener comprising, a blade-holding mechanism, a grinding head, a grinding wheel rotatably carried at one end of said head, means for imparting reciprocal arcuate movement to the other end of said head, and an arcuate support for the intermediate portion of said head, said reciprocal arcuate movement and arcuate support being correlated and said head being proportioned so that said grinding wheel reciprocates in a straight line the ends of which are at opposite sides of a blade in said holding mechanism.

2. A saw blade sharpener comprising a base, a motor and drive shaft carried by said base, a link pivoted to said base coaxially of said drive shaft, a grinding head pivoted to said link by a pivot shaft having its ends extending beyond the sides of said head, a grinding wheel and grinding wheel pulley rotatably mounted in said head, a driving pulley on said drive shaft and a driven pulley on one end of said pivot shaft, an endless belt connecting said driving and driven pulleys, a driving pulley on the other end of said pivot shaft, and an endless belt connecting said last-mentioned driving pulley and said grinding wheel pulley, a crank and connecting rod for imparting reciprocal pivotal motion to said link to cause said wheel to have back and forth non-rotative movement, a blade holder for holding saw blades adjacent said wheel, and an arcuate surface for supporting and guiding said grinding head during said back and forth movement to keep the said back and forth path of said wheel a straight line substantially perpendicular to the plane of a saw blade in said blade holder.

3. In a machine for sharpening metal cutting saws with teeth longitudinally alined and set to opposite sides thereof, a reciprocating member for supporting one end of a grinding wheel head and imparting reciprocal arcuate movement thereto, a grinding head having one end pivotally mounted on said member, a rotatable grinding wheel carried at the other end of said head, an arcuate cam mounted adjacent said head for guiding said head so that said wheel while rotating is reciprocated radially in a straight line, and a cam follower on said head intermediate the ends thereof and resting on said arcuate cam to provide a second support for said head, the arcuate path of said cam being identical with that inscribed by said follower when said one end is reciprocated while said other end is restrained to movement in a straight line.

4. A saw blade sharener comprising a blade-holding mechanism, a grinding head, a grinding wheel rotatably carried at one end of said head, means for imparting reciprocal arcuate movement to the other end of said head, an arcuate support for the intermediate portion of said head shaped to guide said intermediate portion to cause said grinding wheel to reciprocate in a straight line, blade indexing mechanism including a double peaked cam for timing said mechanism with said reciprocal arcuate movement to advance a blade in said mechanism one tooth for each stroke, and a coolant system including a plunger operated by said double peaked cam.

OTTO M. JENSEN.

REFERENCES CITED

The following references are of record in the file of this patent:

UNITED STATES PATENTS

| Number | Name | Date |
|---|---|---|
| 626,451 | Alden et al. | June 6, 1899 |
| 675,780 | Lucal | June 4, 1901 |
| 705,232 | Hallden | July 22, 1902 |
| 712,772 | Davis | Nov. 4, 1902 |
| 729,667 | Robinson | June 2, 1903 |
| 938,159 | Lucal | Oct. 26, 1909 |
| 1,301,190 | Stowell | Apr. 22, 1919 |